United States Patent
Sommese et al.

(10) Patent No.: US 9,213,915 B2
(45) Date of Patent: Dec. 15, 2015

(54) SPARSE ADAPTIVE FILTER

(71) Applicant: RAYTHEON COMPANY, Waltham, MA (US)

(72) Inventors: Anthony Sommese, Port Jefferson, NY (US); Bradley A. Flanders, Whitier, CA (US); Ian S. Robinson, Redondo Beach, CA (US)

(73) Assignee: Raytheon Company, Waltham, MA (US)

( * ) Notice: Subject to any disclaimer, the term of this patent is extended or adjusted under 35 U.S.C. 154(b) by 460 days.

(21) Appl. No.: 13/837,866

(22) Filed: Mar. 15, 2013

(65) Prior Publication Data

US 2015/0161475 A1 Jun. 11, 2015

(51) Int. Cl.
G06K 9/46 (2006.01)
G06K 9/52 (2006.01)
G06K 9/00 (2006.01)
G06K 9/62 (2006.01)
G06K 9/48 (2006.01)

(52) U.S. Cl.
CPC .............. *G06K 9/522* (2013.01); *G06K 9/0063* (2013.01); *G06K 9/48* (2013.01); *G06K 9/623* (2013.01)

(58) Field of Classification Search
None
See application file for complete search history.

(56) References Cited

U.S. PATENT DOCUMENTS 5,371,542 A * 12/1994 Pauli et al. .................... 348/262

OTHER PUBLICATIONS

Sheffer, D. et al., "Comparison of Band Selection Results using Different Class Separation Measures in Various Day and Night Conditions", Proceedings of SPIE, vol. 5093, Sep. 24, 2003, pp. 452-461.
Ashton, E.A., "C Evaluation of Multiband Signal-to-Clutter Ratio as a Prefomance Metric for Multispectral Detection", http://opticalengineering.spiedigitallibrary.org/data/Journals/OPTICE/21855/26181 retrieved on Mar. 25 2014,the whole document; Jan. 1, 1997, pp. 91.
Robila, S.A., et al., "Hyperspectral Data Processing in a High Performance Computing Environment", IEEE International Parallel & Distributed Processing Symposium, 2011, pp. 1424-1431.
Rotman, S.R., et al.,"The Impact of Band Selection on Hyperspectral Point Target Detection Algorithms", IEEE 2010, pp. 4761-4763.
Harari Y., et al., "Band Selection in Hyperspectral Images Based on the Fisher Linear Discriminant Classifier", IEEE 26th Convention of Electrical and Electronics Engineers in Israel 2010, pp. 60-62.

* cited by examiner

*Primary Examiner* — Chan Park
*Assistant Examiner* — Elisa Rice
(74) *Attorney, Agent, or Firm* — Burns & Levinson LLP; Joseph M. Maraia (57) ABSTRACT

The disclosure provides a filtering engine for selecting a subset of hyperspectral imaging wavebands having information useful for detecting a target in a scene. Selecting these wavebands, called "sparse bands," is an iterative process. One or more search techniques of varying computational complexity are used in the process. The techniques rely on various selection criteria, including a signal to clutter ratio that measures the "goodness" of band selection. A convenient example of the filtering engine uses several of the techniques together in a layered approach. In this novel approach, simpler computational techniques are applied, initially, to reduce a number of bands. More computationally intensive techniques then search the reduced band space. Accordingly, the filtering engine efficiently selects a set of sparse bands tailored for each target and each scene, and maintains some of the detection capability provided with a full set of wavebands.

19 Claims, 8 Drawing Sheets

Covariance Matrix ($P_n$)F

$$\begin{array}{|c|c|} \hline P(-) & c \\ \hline c^T & \sigma^2_n \\ \hline \end{array}$$

$P_{n-1} = P(-)$

Covariance Matrix Inverse ($P^{-1}_n$)

$$\begin{array}{|c|c|} \hline \gamma & a \\ \hline a^T & \alpha^2 \\ \hline \end{array}$$

$P^{-1}_{n-1} = \gamma - \alpha^2 a a^T$

SPARSE ADAPTIVE FILTER

BACKGROUND

This disclosure relates generally to the field of image processing, and more particularly to a system and a method for selecting, on a per material and per scene basis, hyperspectral wavebands that are useful for detecting materials in hyperspectral scenes.

In many conventional image processing scenarios comprising hyperspectral imaging (HSI) systems, hyperspectral sensors collect data of an image from one spatial line and disperse the spectrum across a perpendicular direction of the focal plane of the optics receiving the image. Thus a focal plane pixel measures the intensity of a given spot on the ground in a specific waveband. A complete HSI cube scene is formed by scanning this spatial line across the scene that is imaged. The complete HSI cube may be analyzed as a measurement of the spectrum, the intensity in many wavebands, for a spatial pixel. This spatial pixel represents a given spot on the ground in a cross-scan direction for one of the lines at a given time in the scan direction. These spectra are analyzed to detect targets or spectral anomalies.

SUMMARY

Hyperspectral sensors collect a lot of information. Processing all this information to detect target(s) in a scene is very computationally intensive. Only a fraction of the information collected is useful to detecting targets. More specifically, given the information represented by a full set of wavebands or bands, some of the bands have useful information. As such, performing a filtering process to select which bands are useful, called "sparse bands," and then performing a detection process using the selected sparse bands, can reduce the amount of computing needed to find to a target. In turn, a less powerful processor(s) can be used saving electricity, cost, and/or size, just to name a few benefits.

Which of the bands in a full set of bands are sparse bands, however, changes from target to target and from scene to scene. Consider a real-world example of trying to look for a blue tarp in Southern California, which includes urban, suburban, rural, and desert scenes or backgrounds. The blue tarp can be found by detecting a particular contrast (i.e., signature) between the spectrum of the blue tarp and the spectrum of a background including the blue tarp. The contrast, however, differs for each combination of the blue tarp and respective background. For example, the blue tarp against an empty and uniform desert looks, hyperspectally, different than against an urban background, which may include other blue-colored objects, such as a blue car or mailbox.

Accordingly, there is a need to dynamically and adaptively search a full set of bands for a set of sparse bands unique to each combination of target and scene. Furthermore, there is a need to perform a dynamic and adaptive sparse band selection process that limits search overhead processing and performs fewer computations than to processing a full set of bands.

A filtering engine according to examples described herein address the foregoing needs by successively testing bands to compute a signal to clutter ratio using a target reference spectrum and scene covariance matrix (and its inverse). The selection process is iterative and, in a preferred example of the filtering engine, uses three search techniques. The three search techniques are called "Ranking," "Leave One Out," and "Variable Band Search." They are described below in order of least computational complexity to greatest computational complexity.

How "good" the selected bands for detecting materials in scenes is related to the computational complexity. The best selection method, "Variable Band search", is the most computationally complex. A convenient example of the filtering engine uses Ranking and Leave One Out, sequentially, to eliminate low value bands (i.e., bands with little or no useful information), and then uses the Variable Band Search to select a final set. The layered approach uses many fewer operations than using Variable Band Search alone but observations have shown that the layered approach provides comparable results.

The measure of goodness for band selection is the band signal-to-clutter ratio or "SCR" either as a fraction of the full dimension SCR or as a stand-alone value.

$$SCR = (s - \mu_b)^T \Sigma_b^{-1} (s - \mu_b)$$

where:
s = known target spectrum
$\mu_b$ = mean background
$\Sigma_b$ = covariance matrix One of the advantages to using the SCR as an evaluation criterion is that a set of bands can be evaluated without having to process all pixels and can be computed quickly.

Other examples of the filtering engine use the selected sparse bands to determine which pixels should be re-tested using full dimension matched filter (MF), Adaptive Cosine/Coherence Estimator (ACE) or other spectral filter. Still other examples of the filtering engine use the selected sparse bands to determine whether to compute a modified MF score using a local covariance within the vicinity of a target. The local covariance can be a more appropriate measure of background than the full scene covariance (COV). However, it is often numerically unstable to compute a local covariance using full dimensions.

In contrast to the filtering engine and its examples, prior attempts have utilized band selection for class separation and specific discrimination of a singular feature using training data, rather than dynamically selecting a subset of wavebands. Other prior attempts have used band similarity/disparity including first spectral derivative (FSD) and uniform spectral spacing (USS). Researchers have investigated techniques involving principal component analysis (PCA), noise-adjusted PCA, distance-based measurement, and information-theory-based band selection. None of these prior techniques, however, describe band selection optimized on a per scene, per target basis.

For example, Chang describes an approach called "Band Correlation Minimization" that works on a scene-wide basis, independent of the target.

Rotman et al. postulate that there should be a best band subset for every statistical filter in each scene but does not describe how to find such a set in practice. Rotman et al., show that if one can compute a Receiver Operating Characteristic (ROC) curve, a parameter can be extracted from the ROC curve to compare performance of different band sets and algorithms. This is not enabling because one can only compute a ROC curve when one has truth data as to which pixels contain targets and which do not. Typically, such data is not available when trying to detect targets. Further, Rotman et al. do a sequential search of band space susceptible to finding local minima in the search.

In contrast to the filtering engine (and its examples), none of the foregoing references describes an approach to dynamically find a "good enough" band set for detection using signal-to-clutter ratio as a metric of "goodness." None of the foregoing references describes a layered search criteria approach. None of the foregoing references describes a two-step process to obtain equivalent performance as full dimension processing.

In accordance with an example, a method for selecting a subset of hyperspectral imaging wavebands to detect a target in a scene includes, in a filtering engine provided with a plurality of spectra of a target and a covariance matrix of a scene, for each spectrum in the plurality of spectra of the target, computing a signal-to-clutter ratio of a full set of wavebands. The computed signal-to-clutter ratio of the full set of wavebands represents the probability of detecting the target viewed in the scene. The method further includes selecting a subset of the full set of wavebands and computing a signal-to-clutter ratio of the selected subset of wavebands. The computed signal-to-clutter ratio of the selected subset of wavebands represents the probability of detecting the target viewed in the scene using the selected subset of wavebands. The method further includes comparing the signal-to-clutter ratio of the subset of wavebands to the signal-to-clutter ratio of the full set of wavebands and determining whether the subset of wavebands is a good enough set of wavebands based on the comparison. The method further includes providing the good enough set of wavebands to detect the target in the scene. In some examples of the method, the selected subset of wavebands having a specified number of wavebands is a good enough set of wavebands. In other examples of the method, the selected subset of wavebands having a specified signal-to-clutter ratio or having a specified fraction of the total signal-to-clutter ratio for the full set of wavebands is a good enough set of bands.

In accordance with an example, a system for selecting a subset of hyperspectral imaging wavebands to detect a target in a scene includes a memory storing computer executable instructions and at least one interface receiving a plurality of spectra of a target and a covariance matrix of a scene. The system further includes a filtering engine coupled to the memory and the at least one interface. The computer executable instructions when executed by the filtering engine cause the filtering engine to, for each spectrum in the plurality of spectra of the target, compute a signal-to-clutter ratio of a full set of wavebands. The computed signal-to-clutter ratio of the full set of wavebands represents the probability of detecting the target viewed in the scene. The filtering engine further caused to select a subset of the full set of wavebands and compute a signal-to-clutter ratio of the selected subset of wavebands. The computed signal-to-clutter ratio of the selected subset of wavebands represents the probability of detecting the target viewed in the scene using the selected subset of wavebands. The filtering engine further caused to compare the signal-to-clutter ratio of the subset of wavebands to the signal-to-clutter ratio of the full set of wavebands, and determine whether the subset of wavebands is a good enough set of wavebands based on the comparison. The filtering engine further caused to provide the good enough set of wavebands to detect the target in the scene. In some examples of the system, the selected subset of wavebands having a specified number of wavebands is a good enough set of wavebands. In other examples of the system, the selected subset of wavebands having a specified signal-to-clutter ratio or having a specified fraction of the total signal-to-clutter ratio for the full set of wavebands is a good enough set of bands.

In accordance with an example, a tangible computer-readable storage medium storing computer readable instructions for processing images, which when executed by one or more processors cause the one or more processors provided with a plurality of spectra of a target and a covariance matrix of a scene cause the one or more processors to, for each spectrum in the plurality of spectra of the target, compute a signal-to-clutter ratio of a full set of wavebands. The computed signal-to-clutter ratio of the full set of wavebands represents the probability of detecting the target viewed in the scene. The one or more processors further caused to select a subset of the full set of wavebands, and compute a signal-to-clutter ratio of the selected subset of wavebands. The computed signal-to-clutter ratio of the selected subset of wavebands represents the probability of detecting the target viewed in the scene using the selected subset of wavebands. The one or more processors further caused to compare the signal-to-clutter ratio of the subset of wavebands to the signal-to-clutter ratio of the full set of wavebands, and determine whether the subset of wavebands is a good enough set of wavebands based on the comparison. The one or more processors further caused to provide the good enough set of wavebands to detect the target in the scene. In some examples of the medium, the selected subset of wavebands having a specified number of wavebands is a good enough set of wavebands. In other examples of the medium, the selected subset of wavebands having a specified signal-to-clutter ratio or having a specified fraction of the total signal-to-clutter ratio for the full set of wavebands is a good enough set of bands.

In other examples, any of the aspects above can include one or more of the following features.

In some examples, selecting the subset of wavebands includes computing a matched filter weight for each waveband in the full set of wavebands, and then deleting wavebands with the smallest matched filter weights from the full set of wavebands resulting in a reduced set of wavebands. The reduced set of wavebands being the subset of wavebands that is selected and from which the good enough set of wavebands is determined.

In other examples, selecting the subset of wavebands includes determining, in a number of iterations, reduced sets of wavebands. In each iteration, computing a matched filter weight for each waveband in an input set of wavebands. The input set of wavebands of a first iteration being the full set of wavebands and the input set of wavebands of subsequent iterations being the reduced sets of wavebands from previous iterations. Deleting a waveband with the smallest matched filter weight from the input set of wavebands resulting in a reduced set of wavebands. Ending the iterations when the reduced set of wavebands has a specified number of wavebands, specified signal-to-clutter ratio or has a specified fraction of the total signal-to-clutter ratio for the full set of wavebands. The reduced set of wavebands being the subset of wavebands that is selected and from which the good enough set of wavebands is determined.

In some examples, selecting the subset of wavebands includes determining, in a number of iterations, included sets of wavebands. In each iteration, selecting a waveband from a group of wavebands which when combined with wavebands of an input set of wavebands have, collectively, the highest signal-to-clutter ratio. The group of wavebands of a first iteration being a full set of wavebands and groups of wavebands of subsequent iterations being the full set of wavebands less wavebands selected in previous iterations. Adding the selected waveband to the input set of wavebands resulting in intermediate set of wavebands. The input set of wavebands of a first iteration having a number of wavebands, including zero, and input sets of wavebands of subsequent iterations being included sets of wavebands determined in previous iterations. Deleting one or more wavebands from the intermediate set of wavebands contributing the least to a signal-to-clutter ratio of the intermediate set of wavebands resulting in a set of included wavebands. Ending the iterations when the set of included wavebands has a specified number of wavebands, specified signal-to-clutter ratio or has a specified fraction of the total signal-to-clutter ratio for the full set of wavebands. The set of included wavebands being the subset of wavebands that is selected and from which the good enough set of wavebands is determined.

In other examples, determining the good enough set of wavebands includes determining a set of wavebands providing a signal-to-clutter ratio that is better than or equal to a specified percentage of the signal-to-clutter ratio of the full set of wavebands.

In some examples, determining the good enough set of wavebands includes determining a fixed number of wavebands belonging to the good enough set of wavebands.

In other examples, determining the good enough set of wavebands includes determining the good enough set of wavebands having
a fixed signal-to-clutter ratio or having fixed fraction of the total signal-to-clutter ratio for the full set of wavebands.

Some examples further include, in the filtering engine provided with a plurality of pixels in the scene, processing each pixel in the plurality of pixels with the good enough set of wavebands. Identifying which pixels in the scene are candidate detections based on the processed pixels. Processing each of the candidate detections with the full set of wavebands. Detecting the target in the scene based on the processed candidate detections.

Other examples further include, in the filtering engine provided with a plurality of pixels in the scene, processing each pixel in the plurality of pixels with the good enough set of wavebands. Identifying which pixels in the scene are candidate detections based on the processed pixels. Processing each of the candidate detections with the full set of wavebands using a localized scene covariance. Detecting the target in the scene based on the localized scene covariance processed candidate detections.

In some examples, selecting the subset of wavebands includes computing a matched filter weight for each waveband in the full set of wavebands. Deleting wavebands with the smallest matched filter weights from the full set of wavebands resulting in a reduced set of wavebands.

In a first round of iterations, determining further reduced sets of wavebands including, in each iteration of the first round of iterations, computing a matched filter weight for each waveband in a first round input set of wavebands. The first round input set of wavebands of a first iteration being the reduced set of wavebands determined from the full set of wavebands and the first round input sets of wavebands of subsequent iterations being the further reduced sets of wavebands from previous iterations of the first round of iterations. Deleting a waveband with the smallest matched filter weight from the first round input set of wavebands resulting in a further reduced set of wavebands. Ending the first round of iterations when the further reduced set of wavebands has a specified number of wavebands, specified signal-to-clutter ratio or has a specified fraction of the total signal-to-clutter ratio for the full set of wavebands.

In a second round of iterations, determining included sets of wavebands including, in each iteration of the second round of iterations, selecting a waveband from a group of wavebands which when combined with wavebands of a second round input set of wavebands have, collectively, the highest signal-to-clutter ratio. The group of wavebands of a first iteration being the further reduced set of wavebands determined in the first round of iterations and groups of wavebands of subsequent iterations being the further reduced set of wavebands less wavebands selected in previous iterations of the second round of iterations. Adding the selected waveband to the second round input set of wavebands resulting in intermediate set of wavebands. The second round input set of wavebands of a first iteration having a number of wavebands, including zero, and second round input sets of wavebands of subsequent iterations being included sets of wavebands determined in previous iterations of the second round of iterations. Deleting one or more wavebands from the intermediate set of wavebands contributing the least to a signal-to-clutter ratio of the intermediate set of wavebands resulting in a set of included wavebands. Ending the second round of iterations when the set of included wavebands has a specified number of wavebands, specified signal-to-clutter ratio or has a specified fraction of the total signal-to-clutter ratio for the full set of wavebands. The set of included wavebands being the subset of wavebands that is selected and from which the good enough set of wavebands is determined.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

In the description that follows, like components have been given the same reference numerals, regardless of whether they are shown in different examples. To illustrate an example (s) of the present disclosure in a clear and concise manner, the drawings may not necessarily be to scale and certain features may be shown in somewhat schematic form. Features that are described and/or illustrated with respect to one example may be used in the same way or in a similar way in one or more other examples and/or in combination with or instead of the features of the other examples.

Figure 1:
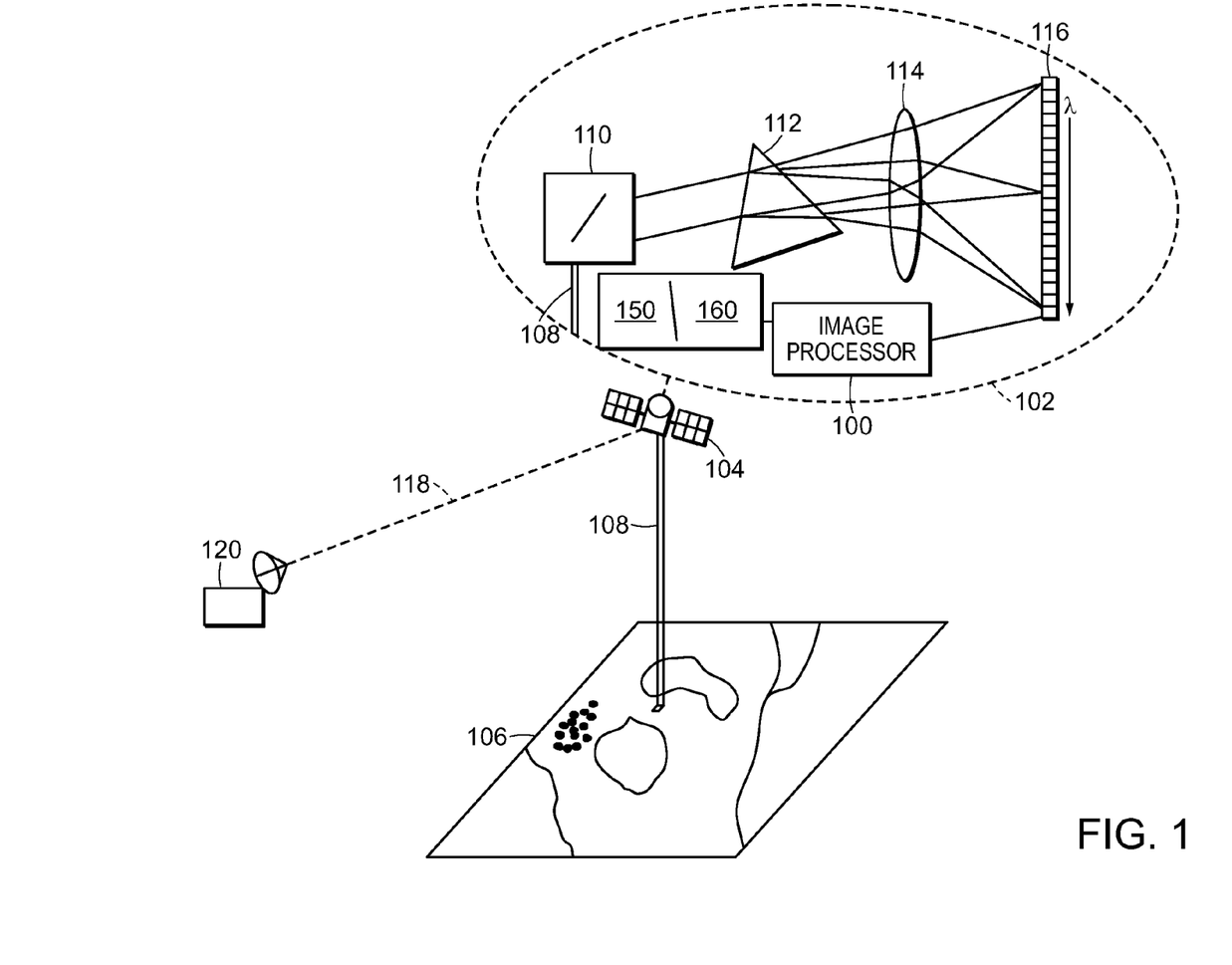
FIG. 1 is a block diagram of an example imaging system with a filtering engine.

Depicted in FIG. 1 is an example of imaging system 102 that is configured to process images and to detect materials/targets in backgrounds/scenes. By way of example only, imaging system 102 may be a hyperspectral imaging system. The term "hyperspectral" refers to imaging narrow spectral bands over a continuous spectral range, and producing the spectra of all pixels in a scene (e.g., scene 106). Imaging system 102 may be stationary or mobile, airborne or land based (e.g., on an elevated land structure or building), or may be on an aircraft or a satellite. As shown, imaging system 102 may incorporate image processor 100, and may be coupled to or otherwise contained within remote imaging system 104. Remote imaging system 104 may be of any suitable construction or configuration, including but not limited to comprising a satellite, an aerial surveillance system, or any other system that can capture images. Additionally, remote imaging system 104 may be stationary or mobile. In an example, imaging system 102 and remote imaging system 104 may be configured to capture one or more images of a particular scene 106 corresponding to a geographical area (e.g., a ground terrain).

In an example, remote imaging system 104 may be configured to use imaging system 102 to capture hyperspectral image(s) of scene 106 that are provided as input hyperspectral image (HSI) scenes to image processor 100. In an example, hyperspectral imaging system 102 may include one or more scan mirrors 110, or may include other optics arranged to receive light 108 reflected from one or more ground resolution cells. Light 108 reflected from one or more ground resolution cells, and generally the entire scene 106, may be used by image processor 100 to determine an input reflectivity of input HSI scene. Input HSI scene may be a part of scene 106, or may be the entire scene 106 depending upon specific target detection goals. In an example, scan mirrors 110 or the other optics may then direct light 108 through dispersing element 112, which may be arranged to separate light 108 into various different wavelengths (i.e., a spectra). After being separated into the various different wavelengths, light 108 may then be directed to one or more imaging optics 114, which may focus the various wavelengths onto a focal plane of detector array 116. As such, detector array 116 may capture hyperspectral data across the spectrum of wavelengths, thereby generating a data set corresponding to a hyperspectral image of scene 106.

As shown, the imaging system 102 includes a detecting engine 150 for detecting a target in a scene, such as a material against a background. HSI sensors typically collect 200-400 narrow spectral bands over a given sensing regime (e.g., visible and near infra-red (VNIR)/short wave infrared (SWIR) and long wave infrared (LWIR)). It may not be practical for the detecting engine 150 to process this amount of information, especially when the detecting engine 150 is located "on-broad" the remote imaging system 104, as shown in the figure. It may also not be practical to process this amount of information "on-ground." Ground stations are not able to process total daily collections in excess of several terabytes per day.

The amount of information processed by the detecting engine 150 can be reduced by reducing the number of hyperspectral imaging wavebands used to analyze hyperspectral images. Often for a given target in a specific scene (referred to as a target/scene pair or material/background pair), there are 5-20 hyperspectral imaging wavebands that contain over 90% of the useful information. Accordingly, the imaging system 102 further includes a filtering engine 160. The filtering engine 160 selects subsets of hyperspectral imaging wavebands having information useful for detecting targets in scenes. These informative bands are called "sparse bands" and are components of a "sparse filter."

Figure 2:
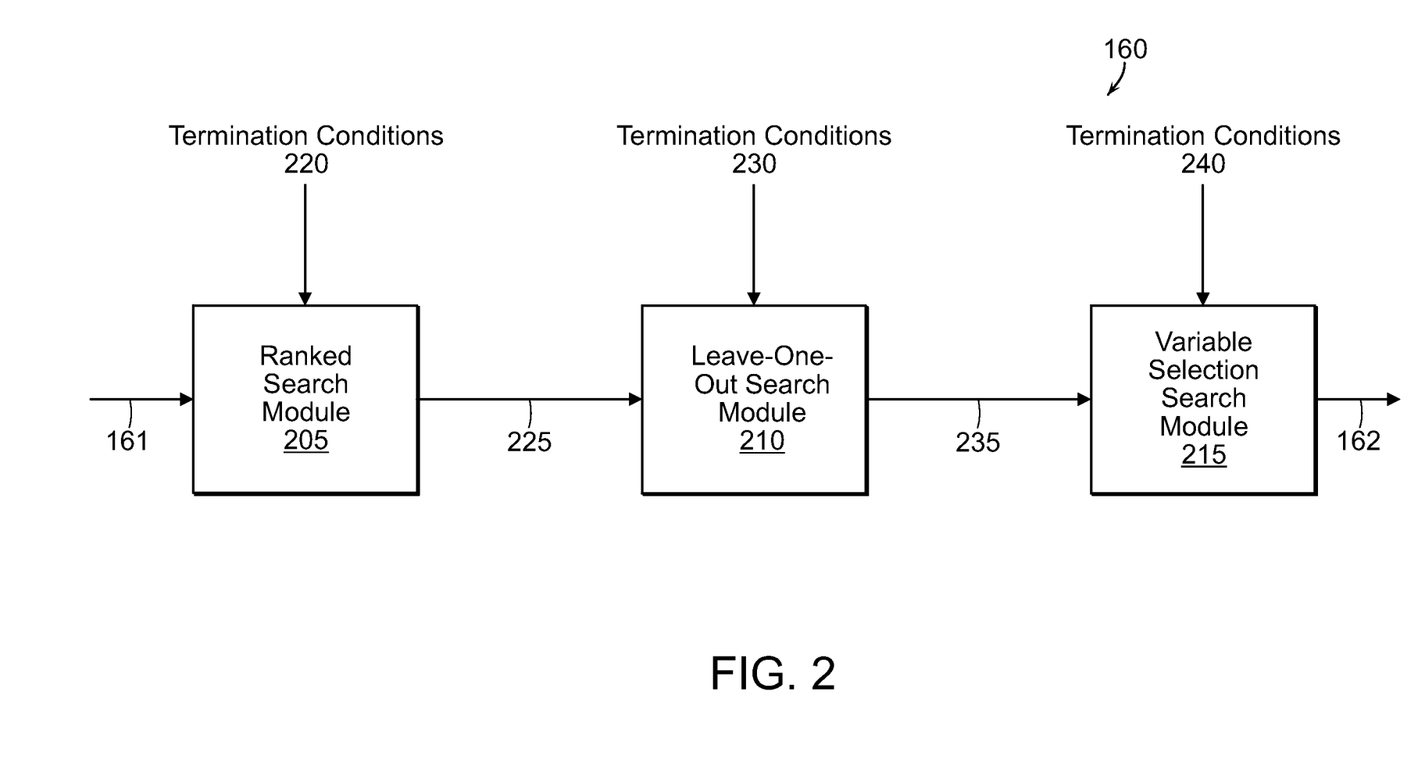
FIG. 2 is a block diagram of an example of the filtering engine.

FIG. 2 shows an example of the filtering engine 160. Inputs 161 to the filtering engine 160 include a background mean vector and covariance matrix, target reference vector, process control parameters, and "goodness" criteria. The goodness criteria may be, for example, a specified number of wavebands, a specified signal-to-clutter ratio or a specified fraction of the total signal-to-clutter ratio for the full set of wavebands.

The goodness criteria may be provided by a user to the filtering engine 160 (e.g., via with a user interface element communicative coupled to or part of the filtering engine 160). The goodness criteria may be provided in response to particular application or mission. For example, when the mission is to find particular vegetation, the filtering engine 160 is provided with a first goodness criterion. When the mission changes to find explosives, the filtering engine 160 is provided with a second goodness criterion different than the first. Differences in goodness criterion from one application to another may reflect the different criticality of the applications.

Outputs 162 of the filtering engine 160 include selected bands for material/background (or target/scene) pairs. Some examples of the filtering engine 160 use a layered approach to select a set of sparse bands each tailored for a particular material/background (or target/scene) pair.

Figure 3:
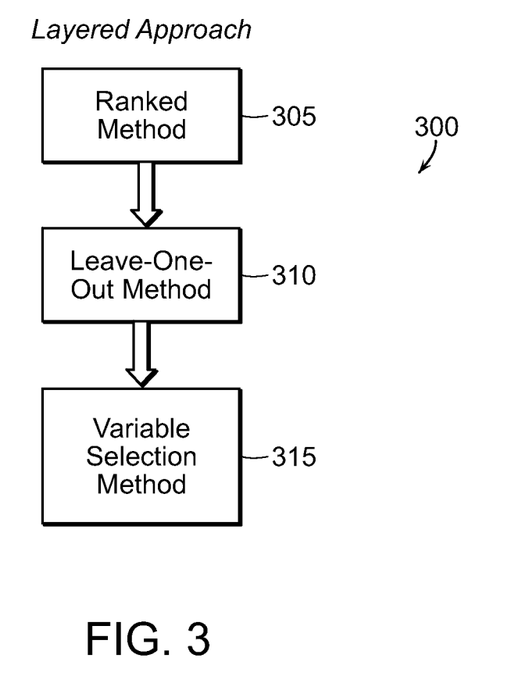
FIG. 3 is a block diagram of an example of a layered approach employed by the filtering engine of FIG. 2.

FIG. 3 shows an example of a layered approach 300. The layered approach 300 includes a ranked search technique 305, leave-one-out search technique 310, and variable search technique 315. The search techniques 305, 310, and 315 are said to be layered because the output of one search technique is the input to a next search technique. Layering the search techniques brings computational efficiency to band selection. Each subsequent search technique is "better" at selecting bands but at the expense of more computations. For example, in convenient example of the layered approach 300, the first two search techniques, ranked and leave-one-out, are designed to quickly remove bands that are not useful (i.e., with little or no information) for detecting targets in scenes. The result is a manageable subset of bands that can be supplied to the final, variable search technique for optimal selection of bands.

Returning to the example of FIG. 2, the filtering engine 160 includes a ranked search module 205 implementing the ranked search technique 305, a leave-one-out search module 210 implementing the leave-one-out search technique 310, and a variable search module 215 implementing variable search technique 315. The modules 205, 210, and 215 are communicatively coupled to one another as shown.

In operation of a convenient example of the filtering engine 160, the ranked search module 205 uses normalized matched filter weights calculated in full dimensions to quickly eliminate bands that are not useful for detection. The ranked search module 205 receives the input 161 (e.g., for the image processor 100 of FIG. 1), including a full set of wavebands for a particular material/background (or target/scene) pair and an associated SCR (full band SCR). The ranked search module 205 also receives termination conditions 220 including a "good enough" condition for the ranked search technique 305. (The good enough condition is described in greater detail below.)

The ranked search module 205 calculates the normalized weights by multiplying the matched filter weights in each wavelength by the standard deviation for that wavelength.

$$W_{MF} = \Sigma_b^{-1}(s - \mu_b),$$

where
$W_{MF}$ are the matched filter weights
and where:
s=known target spectrum
$\mu_b$=mean background
$\Sigma_b$=covariance matrix $$W_N = \begin{bmatrix} \sigma_1 & 0 & 0 \\ 0 & \ddots & 0 \\ 0 & 0 & \sigma_n \end{bmatrix} \cdot W_{MF},$$

where $W_N$ are the normalized weights and $\sigma_i$ are the standard deviations of the bands.

This has the effect of equalizing the importance of each band. Without normalization, a band with a large variance in the background scene is given too small a weight after multiplying by the inverse covariance. This may lead to undesirable or erroneous results. Normalizing by multiplying by the standard deviation results in a more appropriate contribution from bands with large or small scene variance.

Once the weights are normalized, the ranked search module 205 ranks them by importance e.g., ones with larger magnitudes are deemed more important. The ranked search module 205 removes lower ranked bands until the good enough condition is satisfied, e.g., a desired number of bands is reached. The goal of the ranked search technique 305 is not to select the "best" bands but to reduce the initial set of bands to a more computationally manageable number for the next level of selection. Therefore the ranked search technique 305 is designed to reject non-informative bands with very little computational overhead. The ranked search module 205 passes an intermediate output 225, including the remaining bands as a reduced band set for the particular material/background pair and an associated reduced SCR to the variable search module 215 to the leave-one-out search module 210.

The leave-one-out search module 210 receives the intermediate output 225 and termination conditions 230 including a "good enough" condition for the leave-one-out search technique 310. The leave-one-out search module 210 iteratively removes the least-informative band until the good enough condition is satisfied, e.g., a desired number of bands is reached.

The leave-one-out search module 210 removes the band with the smallest normalized weight and then recomputing the weights with the remaining bands, and repeating the process. The computational expense is equivalent to taking the inverse of a matrix that is the dimension of the initial number of bands passed to this layer. The leave-one-out search module 210 passes an intermediate output 235, including the remaining bands as a reduced band set for the particular material/background pair and an associated reduced SCR to the variable search module 215.

The variable search module 215, receives the intermediate output 235 and termination conditions 240 including a "good enough" condition for the variable selection search technique 315. The variable search module 215, at any point in its search, adds a band that produces the highest signal-to-clutter ratio (SCR) in conjunction with the bands already selected. The variable search technique 315 is an example of a "greedy" algorithm that has the possibility of become trapped in a local minimum. The variable search module 215 reduces the possibility of this occurring by "backtracking" When the variable search module 215 adds a new band, the variable search module 215 attempts to replace previously selected bands to improve the SCR. The variable search module 215 produces the output 162, including a reduced set of bands for the particular material/background pair and an associated reduced SCR.

While the variable search technique 315 is computationally efficient relative to similar classes of search techniques, the variable search technique 315 is computationally intensive relative to the ranked search technique 305 and leave-one-out search technique 310. Accordingly, in practice, the variable search technique 315 is used to pick a small subset of bands from a manageable initial subset found by the proceeding search techniques.

While the filtering engine 160 is described implementing all three search techniques, each search technique may be executed by itself to perform band selection. As such, other examples of the filtering engine 160 may include a fewer number modules (including 1) executing a fewer number of search techniques (including 1). Having described the search techniques 305, 310, and 315 in the context of the an example of the layered approach 300, as carried out by the filtering engine 160, each search technique and its examples are described in greater detail below.

Figure 4:
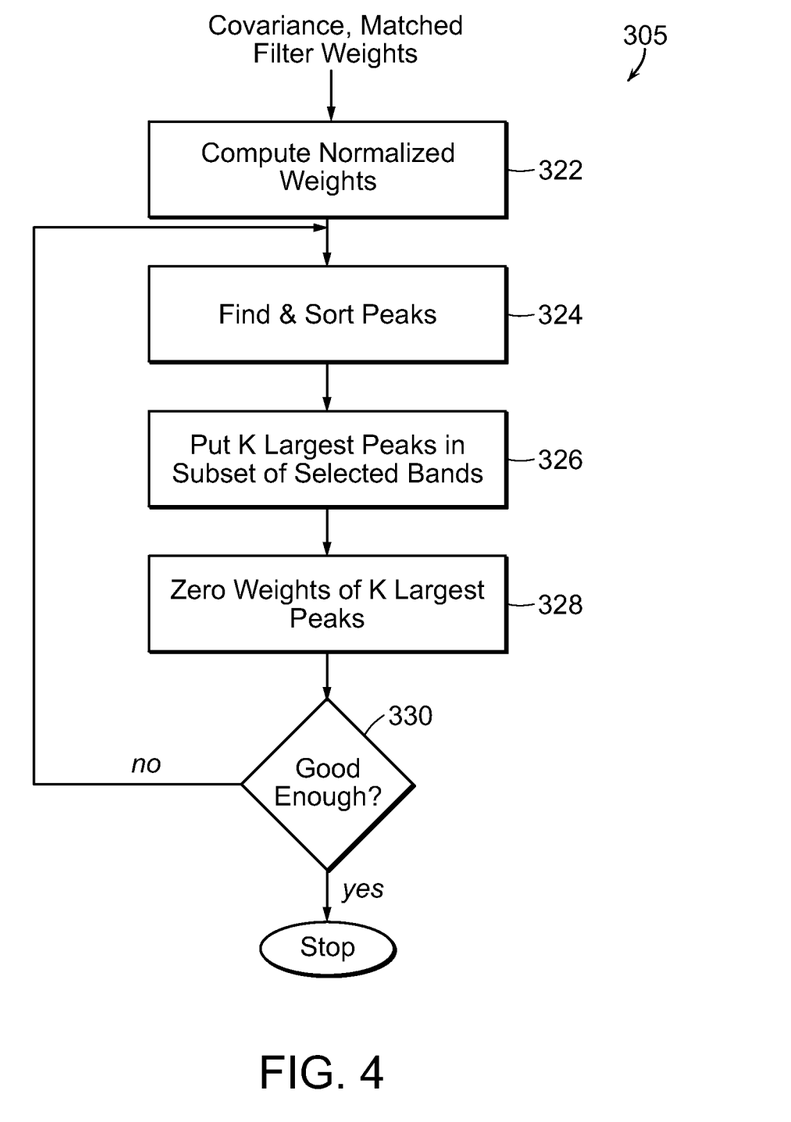
FIG. 4 is a flow chart of an example of a ranked search technique.

FIG. 4 shows an example of the ranked search technique 305 executed by the ranked search module 205. The ranked search module 205 normalizes weights (320). For example, the ranked search module normalizes (320) the weights by multiplying matched filter weights in each wavelength by a standard deviation for that wavelength. Normalization has the effect of equalizing the importance of each band.

After weight normalization (320), the ranked search module 205 selects (324) K largest peaks in magnitude space and adds (326) them to a subset of selected bands. Peaks are used to spread wavelength selections out across the full spectral range. If only the weight magnitudes were used instead of peaks, a search technique would typically chose many wavelengths close to one another because neighboring bands are highly correlated. The ranked search module 205 zeroes (328) the normalized weights for the selected K peaks. Zeroing a weight allows new peaks and, therefore, bands to be chosen close to other bands that are already selected.

The ranked search module 205 repeats the foregoing, as shown in FIG. 4, until the ranked search module 205 determines (330) that the subset of selected bands is a "good enough" set of bands. In some examples of the ranked search technique 305, the subset of selected bands having a specified number of wavebands is a good enough set of bands. In other examples, the subset of selected bands having a specified signal-to-clutter ratio or having a specified fraction of the total signal-to-clutter ratio for the full set of wavebands is a good enough set of bands.

The ranked search technique 305 is very fast in removing non-informative bands. Observations have shown that some examples of the ranked search technique 305 reduce a full band set (~200 bands) to a third the number of bands (~70) without sacrificing much in detection performance. This reduction in bands significantly reduces processing in the subsequent band selection layers.

Figure 5:
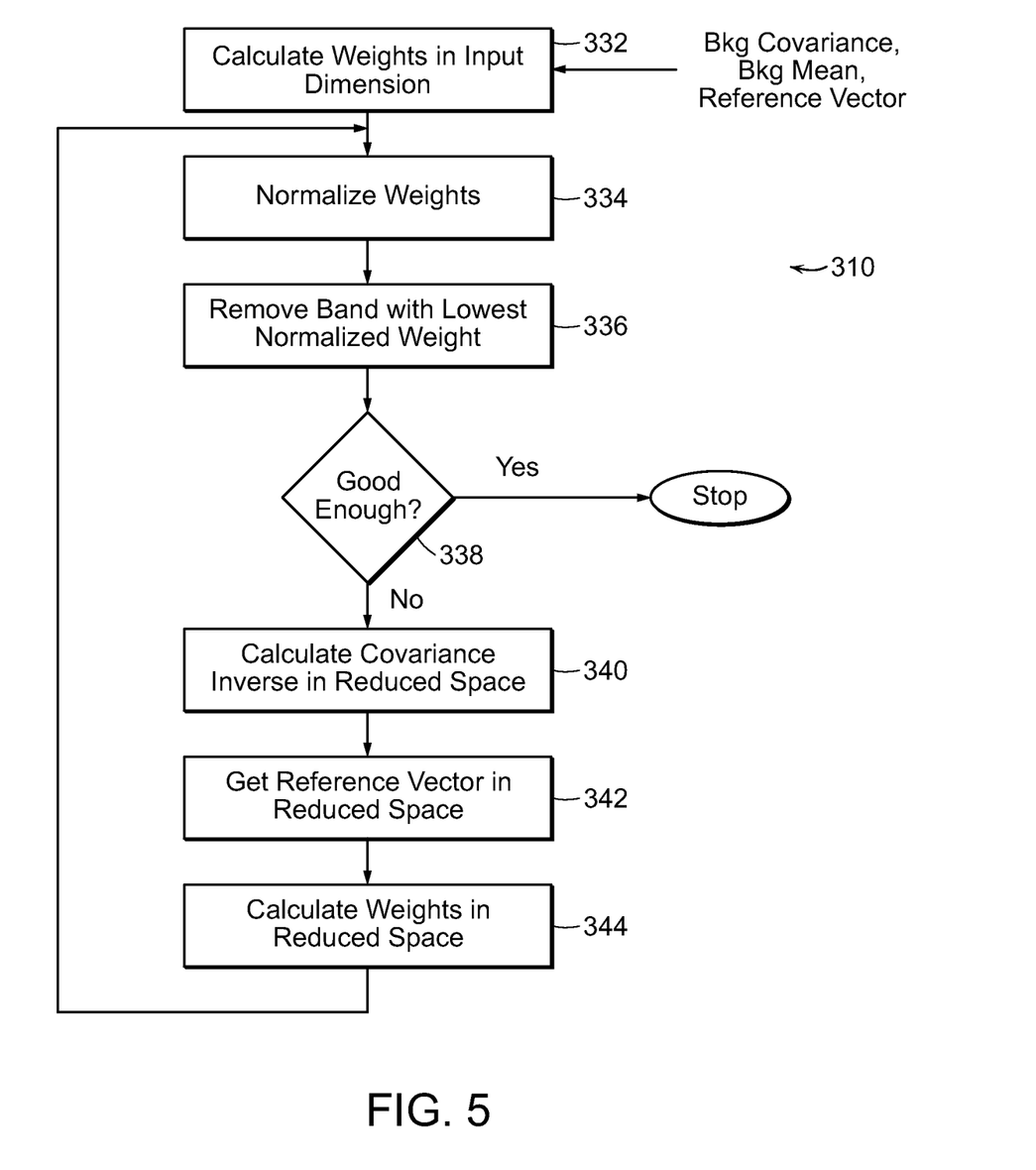
FIG. 5 is a flow chart of an example of a leave-one-out search technique.

FIG. 5 is shows an example of the leave-one-out search technique 310 executed by the leave-one-out search module 210. Operating in a "standalone" mode, inputs to the leave-one-out search module 210 include a background mean vector and covariance matrix, target reference vector, algorithm control parameters, and the desired number of reduced bands. Operating in a "layered" mode, inputs to the leave-one-out search module 210 also include bands selected using the ranked search technique 305 described above. In both modes, the leave-one-out search module 210 iterates removing one non-informative band at a time until the desired number is reached.

The leave-one-out search module 210 calculates (332) matched filter weights using, for example, the standard matched filter equations known in the art. The leave-one-out search module 210 normalizes (334) the calculated weights in a manner similar to one described above in the ranked search technique 305. The leave-one-out search module 210 removes (336) the band with the smallest normalized weight magnitude resulting in a reduced set of bands.

The leave-one-out search module 210 repeats the foregoing until the leave-one-out search module 210 determines (338) that the reduced set of bands is a "good enough" set of bands. In some examples of the leave-one-out search technique 310, the reduced set of bands having a specified number of wavebands is a good enough set of bands. In other examples, the reduced set of bands having a specified signal-to-clutter ratio or having a specified fraction of the total signal-to-clutter ratio for the full set of wavebands is a good enough set of bands.

Having not determined a good enough set of bands at 328, the leave-one-out search module 210 calculates (340) the covariance inverse of the reduced set of bands (i.e., the leave-one-out search module 210 the calculation in reduced space). Typically, each weight calculation requires a matrix inversion that is $O(N3)$ operations where N is the dimension of the matrix to be inverted. Examples of the leave-one-out search technique 310 significantly reduced the number of computations. At each iteration of the leave-one-out search technique 310**, the covariance matrix to be inverted differs by one row and column (for the band to be removed) from the covariance matrix inverted previously.

Figure 6A:
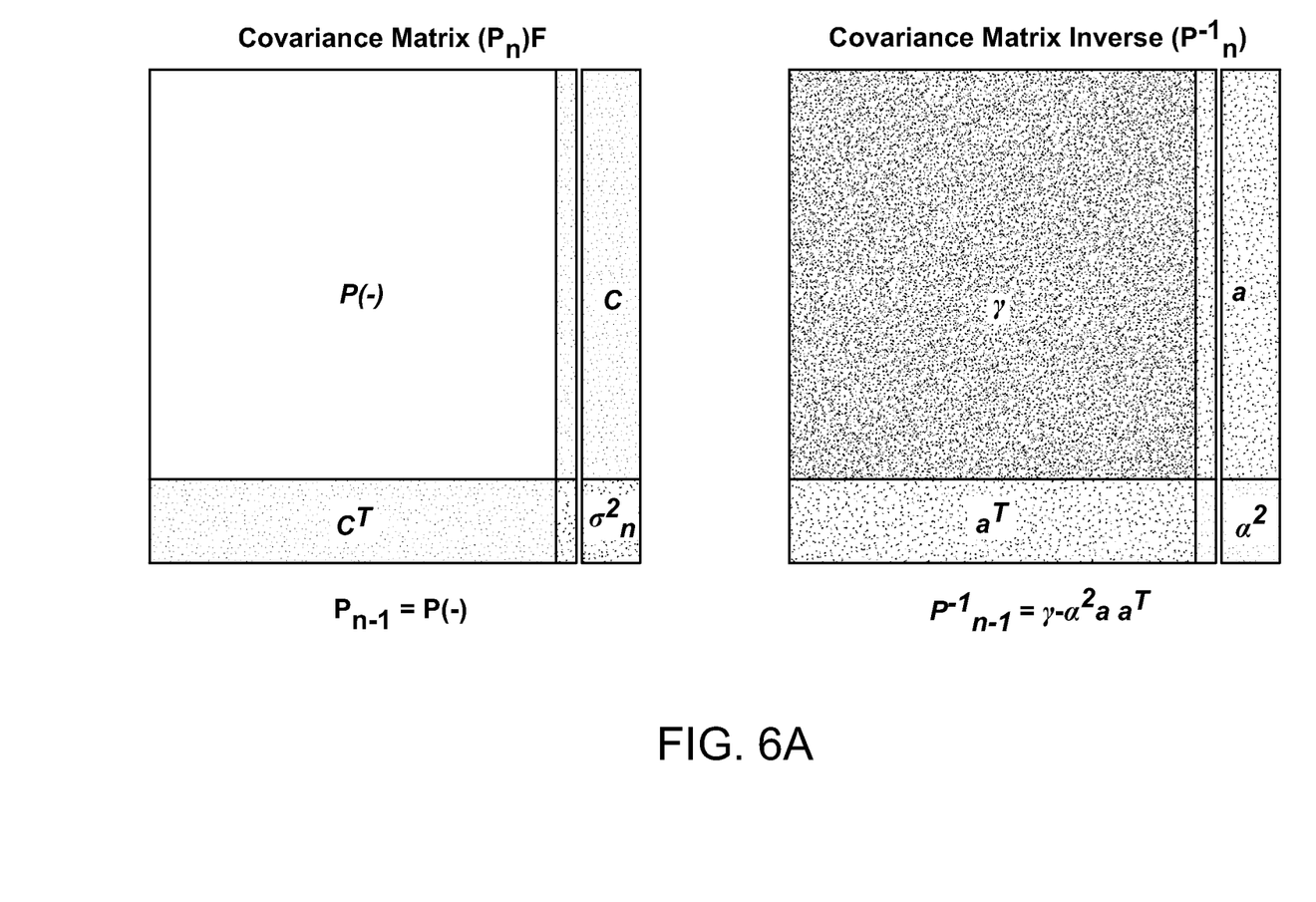
FIGS. 6A and 6B are block diagrams relating to the example of the leave-one-out search technique of FIG. 5.

FIG. 6A gives an example in which a new covariance matrix is formed from the old covariance matrix after the last row and column are removed, which is equivalent to removing the last band. In the figure, the given equation shows the new inverse matrix being calculated in $O(N2)$ operations given the old inverse matrix. In contrast, without any knowledge of the old inverse matrix, the new inverse matrix is computed in $O(N3)$ operations.

Returning to FIG. 5, the leave-one-out search module 210 iterates the leave-one-out search technique 310 by re-computing (344) the matched filter weights of bands in the reduced set of bands and repeating the foregoing as shown in FIG. 5. The reference vector in reduced space is formed by removing the value in the band that was removed above.

Figure 6B:
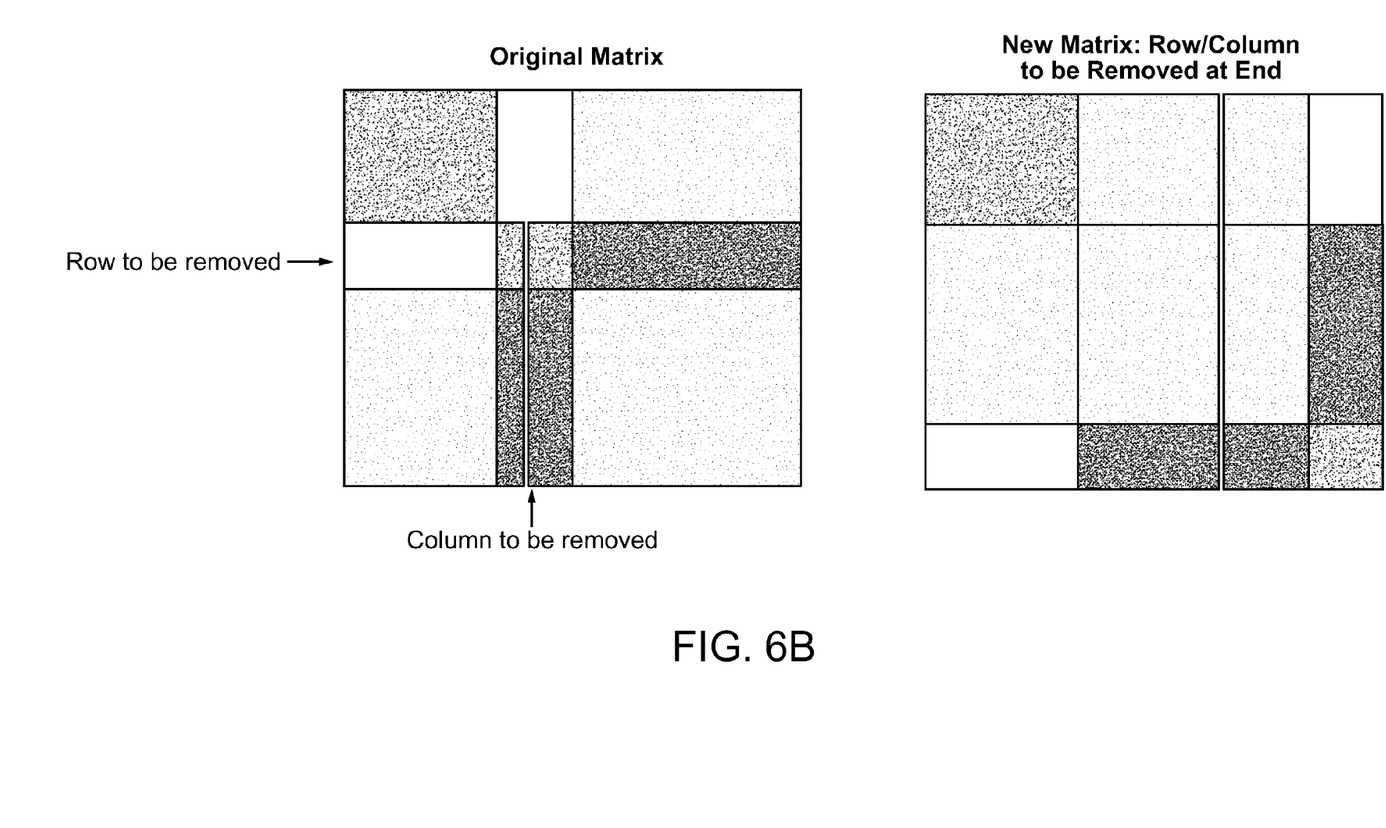

A convenient example of the leave-one-out search technique 310 removes an arbitrary band in two steps. The leave-one-out search module 210 rearranges covariance and covariance inverse using elementary row and column operations as shown in FIG. 6B. The correlations and variance of the band being removed are placed in the last row and column. The leave-one-out search module 210 then computes the new inverse as shown in FIG. 6A. The foregoing example of the leave-one-out search technique 310 allows for all bands to be ranked (reduced) in $O(N3)$ operations because there could be N reductions with each taking $O(N2)$ operations.

An example of the variable search module 215 selects K bands from the subset of bands that are outputted from the leave-one-out search module 210. The variable search module 215 attempts to optimize the SCR for a reference vector against the observed background. Note, the SCR for a selected band set can be computed directly from the covariance matrix, background mean and reference vector. One of the advantages to using the SCR as an evaluation criterion is that a set of bands can be evaluated without having to process all pixels and can be computed quickly.

In general, the variable search technique 315 can run in two modes. The variable search technique 315 can perform "forward" selection where it starts off with no bands (or a few seeded bands) and then continues to add and subtract bands until a "good enough" condition is satisfied, e.g., a desired number of bands is reached. Or the variable search technique 315 can perform backwards selection where it is initialized with all bands and then proceeds to remove and add bands until a desired number of selected band is reached. Both backward and forward selections have been tested on spectral cubes and both searches produced similar results. Therefore, a convenient example of the variable search technique 315 used in the layered approach 300 is forward selection because it takes fewer computations.

Figure 7:
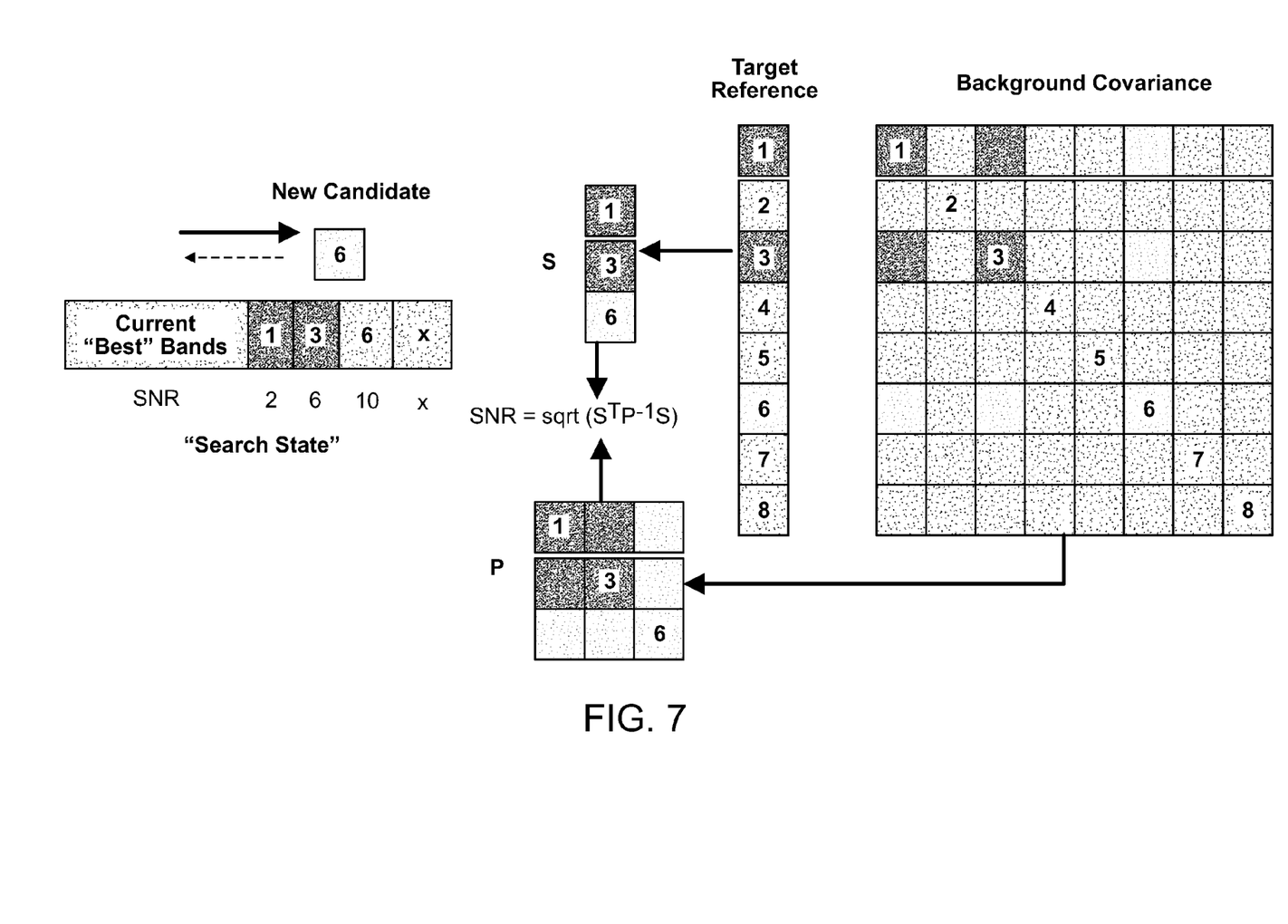
FIG. 7 is a block diagram of an example of a variable search technique.

FIG. 7 shows an example of the variable search technique 315 during the search for the "best" third band. At the point illustrated in the figure, the three bands that provide the highest SCR are bands 1, 3 and 5. The three bands combined produce a SCR of 10. The variable search module 215 determines if there is a better third band than band 5 by evaluating bands 6 thru 8 in place of band 5 in sequence. For each combination, the appropriate covariance elements are taken from the larger covariance matrix (e.g., input from the Leave-one-out Method) as well as the appropriate target reference elements The variable search module 215 takes the appropriate covariance from the larger covariance matrix (e.g., input from the leave-one-out search module 210) as well as the appropriate target reference elements. The variable search module 215 calculates the matched filter SCR using, for example, the matched filter equation shown in paragraph [008].

After trying all bands, the variable search module 215 stores the three band combination that produces the highest (combined) SCR. For example, assume the SCR after trying bands 6 through 8 are all less than 10, then bands 1, 3 and 5 remain the "best" three band combination.

Note the SCR calculation involves the inverse of the smaller covariance matrix, which is computationally intensive. In a convenient example of the variable search technique 315, the computations are sped up significantly by noting that the covariance of a new band set under evaluation is just one band different from the last one. Knowledge of the previous inverse dramatically reduces computations.

After evaluating all three band combinations, the variable search module 215 performs "backtracking" For example, the variable search module 215 ignores band 3 and the variable search module 215 computes the SCR for two-band combination of bands 1 and 5 (band 5 being just determined to be part of the "best" three band combination).

If that SCR is higher than the "best" previous two-band combination (1 and 3), the variable search module 215 removes band 3 from the feature list.

A convenient example of the variable search module 215 saves the SCR for the previous "best" two-band combinations and it does not need to be recomputed. Backtracking looks at all the previously selected bands to see which should be eliminated. Note that a band that is eliminated could be added back later in the search.

After backtracking, the variable search module 215 adds another band and the process is repeated until the desired number of bands is reached.

The above-described systems and methods can be implemented in digital electronic circuitry, in computer hardware, firmware, and/or software, e.g., in imaging system 102. The implementation can be as a computer program product (i.e., a computer program tangibly embodied in an information carrier medium). The implementation can, for example, be in a machine-readable storage device for execution by, or to control the operation of, data processing apparatus. The implementation can, for example, be a programmable processor, a computer, and/or multiple computers.

In one example, a computer program can be written in any form of programming language, including compiled and/or interpreted languages, and the computer program can be deployed in any form, including as a stand-alone program or as a subroutine, element, and/or other unit in image processor 100 suitable for use in a computing environment to carry out the features and functions of various examples discussed herein. A computer program can be deployed to be executed on one computer or on multiple computers at one site (e.g., in imaging system 102).

Method steps or operations can be performed as processes by one or more programmable processors executing a computer program to perform functions of various examples by operating on input data and generating output. Method steps can also be performed by and an apparatus can be implemented as special purpose logic circuitry. The circuitry can, for example, be a field programmable gate array (FPGA) and/or an application specific integrated circuit (ASIC). Modules, subroutines, and software agents can refer to portions of the computer program, the processor, the special circuitry, software, and/or hardware that implements that functionality.

Filtering engine 160 may comprise one or more processors suitable for the execution of a computer program include, by way of example, both general and special purpose microprocessors, and any one or more processors of any kind of digital computer. Generally, a processor receives instructions and data from a read-only memory or a random access memory or both. The elements of a computer may comprise a processor for executing instructions and one or more memory devices for storing instructions and data. Generally, a computer can include, can be operatively coupled to receive data from and/or transfer data to one or more mass storage devices (e.g., a memory module) for storing data (e.g., magnetic, magneto-optical disks, or optical disks). The memory may be a tangible non-transitory computer-readable storage medium having computer-readable instructions stored therein for processing images, which when executed by one or more processors (e.g., filtering engine 160) cause the one or more processors to carry out or implement the features and functionalities of various examples discussed herein.

Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computing device having a display device. The display device can, for example, be a cathode ray tube (CRT) and/or a liquid crystal display (LCD) monitor, and/or a light emitting diode (LED) monitor. The interaction with a user can, for example, be a display of information to the user and a keyboard and a pointing device (e.g., a mouse or a trackball) by which the user can provide input to the computing device (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described systems and techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computing device having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system may be coupled to and/or include clients and servers. A client and a server are generally remote from each other and typically interact through a communication network. The relationship of client and server arises by virtue of computer programs running on the respective computing devices and having a client-server relationship to each other.

Communication networks may include packet-based networks, which can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks may include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The computing device in imaging system 102 may include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., INTERNET EXPLORER® available from Microsoft Corporation, of Redmond, Wash.). The mobile computing device includes, for example, a BLACKBERRY® provided by Research In Motion Limited of Waterloo, Ontario, Canada.

"Comprise," "include," and/or plural forms of each are open ended and include the listed parts and can include additional parts that are not listed. "And/or" is open ended and includes one or more of the listed parts and combinations of the listed parts.

Although the above disclosure discusses what is currently considered to be a variety of useful examples, it is to be understood that such detail is solely for that purpose, and that the appended claims are not limited to the disclosed examples, but, on the contrary, are intended to cover modifications and equivalent arrangements that are within the spirit and scope of the appended claims.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method for selecting a subset of hyperspectral imaging wavebands to detect a target in a scene, the method comprising:
in a filtering engine provided with a plurality of spectra of a target and a covariance matrix of a scene, for each spectrum in the plurality of spectra of the target:
computing a signal-to-clutter ratio of a full set of wavebands representing the probability of detecting the target viewed in the scene;
selecting a subset of wavebands from the full set of wavebands;
computing a signal-to-clutter ratio of the selected subset of wavebands representing the probability of detecting the target viewed in the scene using the selected subset of wavebands;
comparing the signal-to-clutter ratio of the subset of wavebands to the signal-to-clutter ratio of the full set of wavebands;
determining whether the subset of wavebands is a good enough set of wavebands based on the comparison; and
providing the good enough set of wavebands to detect the target in the scene:
wherein selecting the subset of wavebands includes determining, in a number of iterations, reduced sets of wavebands by:
computing a matched filter weight for each waveband in an input set of wavebands, the input set of wavebands of a first iteration being the full set of wavebands and the input set of wavebands of subsequent iterations being the reduced sets of wavebands from previous iterations;
deleting a waveband with the smallest matched filter weight from the input set of wavebands resulting in a reduced set of wavebands; and
ending the iterations when the reduced set of wavebands has a specified number of wavebands, specified signal-to-clutter ratio or has a specified fraction of the total signal-to-clutter ratio for the full set of wavebands, the reduced set of wavebands being the subset of wavebands that is selected and from which the good enough set of wavebands is determined.

2. The method of claim 1, wherein selecting the subset of wavebands includes:
computing a matched filter weight for each waveband in the full set of wavebands; and
deleting wavebands with the smallest matched filter weights from the full set of wavebands resulting in a reduced set of wavebands, the reduced set of wavebands being the subset of wavebands that is selected and from which the good enough set of wavebands is determined.

3. A method for selecting a subset of hyperspectral imaging wavebands to detect a target in a scene, the method comprising:
in a filtering engine provided with a plurality of spectra of a target and a covariance matrix of a scene, for each spectrum in the plurality of spectra of the target:
computing a signal-to-clutter ratio of a full set of wavebands representing the probability of detecting the target viewed in the scene;
selecting a subset of wavebands from the full set of wavebands;
computing a signal-to-clutter ratio of the selected subset of wavebands representing the probability of detecting the target viewed in the scene using the selected subset of wavebands;
comparing the signal-to-clutter ratio of the subset of wavebands to the signal-to-clutter ratio of the full set of wavebands;
determining whether the subset of wavebands is a good enough set of
wavebands based on the comparison; and
providing the good enough set of wavebands to detect the target in the scene:
wherein selecting the subset of wavebands includes determining, in a number of iterations, included sets of wavebands by:
selecting a waveband from an group of wavebands which when combined with wavebands of an input set of wavebands have, collectively, the highest signal-to-clutter ratio, the group of wavebands of a first iteration being a full set of wavebands and groups of wavebands of subsequent iterations being the full set of wavebands less wavebands selected in previous iterations;
adding the selected waveband to the input set of wavebands resulting in intermediate set of wavebands, the input set of wavebands of a first iteration having a number of wavebands, including zero, and input sets of wavebands of subsequent iterations being included sets of wavebands determined in previous iterations;
deleting one or more wavebands from the intermediate set of wavebands contributing the least to a signal-to-clutter ratio of the intermediate set of wavebands resulting in a set of included wavebands; and
ending the iterations when the set of included wavebands has a specified number of wavebands, specified signal-to-clutter ratio or has a specified fraction of the total signal-to-clutter ratio for the full set of wavebands, the set of included wavebands being the subset of wavebands that is selected and from which the good enough set of wavebands is determined.

4. The method of claim 1, wherein determining the good enough set of wavebands includes determining a set of wavebands providing a signal-to-clutter ratio that is better than or equal to a specified percentage of the signal-to-clutter ratio of the full set of wavebands.

5. The method of claim 1, wherein determining the good enough set of wavebands includes determining a fixed number of wavebands belonging to the good enough set of wavebands.

6. The method of claim 1, wherein determining the good enough set of wavebands includes determining the good enough set of wavebands having a fixed signal-to-clutter ratio or having fixed fraction of the total signal-to-clutter ratio for the full set of wavebands.

7. The method of claim 1, further comprising:
in the filtering engine provided with a plurality of pixels in the scene,
processing each pixel in the plurality of pixels with the good enough set of wavebands;
identifying which pixels in the scene are candidate detections based on the processed pixels;

processing each of the candidate detections with the full set of wavebands; and detecting the target in the scene based on the processed candidate detections.

8. The method of claim 1, further comprises:

in the filtering engine provided with a plurality of pixels in the scene, processing each pixel in the plurality of pixels with the good enough set of wavebands;

identifying which pixels in the scene are candidate detections based on the processed pixels;

processing each of the candidate detections with the full set of wavebands using a localized scene covariance; and detecting the target in the scene based on the localized scene covariance processed candidate detections.

9. A method for selecting a subset of hyperspectral imaging wavebands to detect a target in a scene, the method comprising:

in a filtering engine provided with a plurality of spectra of a target and a covariance matrix of a scene, for each spectrum in the plurality of spectra of the target:

computing a signal-to-clutter ratio of a full set of wavebands representing the probability of detecting the target viewed in the scene;

selecting a subset of wavebands from the full set of wavebands;

computing a signal-to-clutter ratio of the selected subset of wavebands representing the probability of detecting the target viewed in the scene using the selected subset of wavebands;

comparing the signal-to-clutter ratio of the subset of wavebands to the signal-to-clutter ratio of the full set of wavebands;

determining whether the subset of wavebands is a good enough set of wavebands based on the comparison; and providing the good enough set of wavebands to detect the target in the scene;

wherein selecting the subset of wavebands includes:

computing a matched filter weight for each waveband in the full set of wavebands; and deleting wavebands with the smallest matched filter weights from the full set of wavebands resulting in a reduced set of wavebands;

in a first round of iterations, determining further reduced sets of wavebands including:

in each iteration of the first round of iterations, computing a matched filter weight for each waveband in a first round input set of wavebands, the first round input set of wavebands of a first iteration being the reduced set of wavebands determined from the full set of wavebands and the first round input sets of wavebands of subsequent iterations being the further reduced sets of wavebands from previous iterations of the first round of iterations;

deleting a waveband with the smallest matched filter weight from the first round input set of wavebands resulting in a further reduced set of wavebands; and ending the first round of iterations when the further reduced set of wavebands has a specified number of wavebands, specified signal-to-clutter ratio or has a specified fraction of the total signal-to-clutter ratio for the full set of wavebands;

in a second round of iterations, determining included sets of wavebands including;

in each iteration of the second round of iterations, selecting a waveband from an group of wavebands which when combined with wavebands of a second round input set of wavebands have, collectively, the highest signal-to-clutter ratio, the group of wavebands of a first iteration being the further reduced set of wavebands determined in the first round of iterations and groups of wavebands of subsequent iterations being the further reduced set of wavebands less wavebands selected in previous iterations of the second round of iterations;

adding the selected waveband to the second round input set of wavebands resulting in intermediate set of wavebands, the second round input set of wavebands of a first iteration having a number of wavebands, including zero, and second round input sets of wavebands of subsequent iterations being included sets of wavebands determined in previous iterations of the second round of iterations;

deleting one or more wavebands from the intermediate set of wavebands contributing the least to a signal-to-clutter ratio of the intermediate set of wavebands resulting in a set of included wavebands; and ending the second round of iterations when the set of included wavebands has a specified number of wavebands, specified signal-to-clutter ratio or has a specified fraction of the total signal-to-clutter ratio for the full set of wavebands, the set of included wavebands being the subset of wavebands that is selected and from which the good enough set of wavebands is determined.

10. A system for selecting a subset of hyperspectral imaging wavebands to detect a target in a scene, the system comprising:

a memory having computer executable instructions thereupon;

at least one interface receiving a plurality of spectra of a target and a covariance matrix of a scene;

a filtering engine coupled to the memory and the at least one interface, the computer executable instructions when executed by the filtering engine cause the filtering engine to, for each spectrum in the plurality of spectra of the target:

compute a signal-to-clutter ratio of a full set of wavebands representing the probability of detecting the target viewed in the scene;

select a subset of the full set of wavebands, including determining, in a number of iterations, reduced sets of wavebands by computing a matched filter weight for each waveband in an input set of wavebands, the input set of wavebands of a first iteration being the full set of wavebands and the input set of wavebands of subsequent iterations being the reduced sets of wavebands from previous iterations, deleting a waveband with the smallest matched filter weight from the input set of wavebands resulting in a reduced set of wavebands, and ending the iterations when the reduced set of wavebands has a specified number of wavebands, specified signal-to-clutter ratio or has a specified fraction of the total signal-to-clutter ratio for the full set of wavebands, the reduced set of wavebands being the subset of wavebands that is selected and from which the good enough set of wavebands is determined;

compute a signal-to-clutter ratio of the selected subset of wavebands representing the probability of detecting the target viewed in the scene using the selected subset of wavebands;

compare the signal-to-clutter ratio of the subset of wavebands to the signal-to-clutter ratio of the full set of wavebands;

determine whether the subset of wavebands is a good enough set of wavebands based on the comparison; and provide the good enough set of wavebands to detect the target in the scene.

11. A tangible non-transitory computer-readable storage medium having computer readable instructions stored therein for selecting a subset of hyperspectral imaging wavebands to detect a target in a scene, which when executed by one or more processors provided with a plurality of spectra of a target and a covariance matrix of a scene cause the one or more processors to, for each spectrum in the plurality of spectra of the target:

compute a signal-to-clutter ratio of a full set of wavebands representing the probability of detecting the target viewed in the scene;

select a subset of the full set of wavebands, including determining, in a number of iterations, reduced sets of wavebands by computing a matched filter weight for each waveband in an input set of wavebands, the input set of wavebands of a first iteration being the full set of wavebands and the input set of wavebands of subsequent iterations being the reduced sets of wavebands from previous iterations, deleting a waveband with the smallest matched filter weight from the input set of wavebands resulting in a reduced set of wavebands, and ending the iterations when the reduced set of wavebands has a specified number of wavebands, specified signal-to-clutter ratio or has a specified fraction of the total signal-to-clutter ratio for the full set of wavebands, the reduced set of wavebands being the subset of wavebands that is selected and from which the good enough set of wavebands is determined;

compute a signal-to-clutter ratio of the selected subset of wavebands representing the probability of detecting the target viewed in the scene using the selected subset of wavebands;

compare the signal-to-clutter ratio of the subset of wavebands to the signal-to-clutter ratio of the full set of wavebands;

determine whether the subset of wavebands is a good enough set of wavebands based on the comparison; and provide the good enough set of wavebands to detect the target in the scene.

12. The method of claim 3, wherein selecting the subset of wavebands includes:

computing a matched filter weight for each waveband in the full set of wavebands; and deleting wavebands with the smallest matched filter weights from the full set of wavebands resulting in a reduced set of wavebands, the reduced set of wavebands being the subset of wavebands that is selected and from which the good enough set of wavebands is determined.

13. The method of claim 3, wherein determining the good enough set of wavebands includes determining a set of wavebands providing a signal-to-clutter ratio that is better than or equal to a specified percentage of the signal-to-clutter ratio of the full set of wavebands.

14. The method of claim 3, wherein determining the good enough set of wavebands includes determining a fixed number of wavebands belonging to the good enough set of wavebands.

15. The method of claim 3, wherein determining the good enough set of wavebands includes determining the good enough set of wavebands having a fixed signal-to-clutter ratio or having fixed fraction of the total signal-to-clutter ratio for the full set of wavebands.

16. The method of claim 3, further comprising:

in the filtering engine provided with a plurality of pixels in the scene, processing each pixel in the plurality of pixels with the good enough set of wavebands;

identifying which pixels in the scene are candidate detections based on the processed pixels;

processing each of the candidate detections with the full set of wavebands; and detecting the target in the scene based on the processed candidate detections.

17. The method of claim 3, further comprising:

in the filtering engine provided with a plurality of pixels in the scene, processing each pixel in the plurality of pixels with the good enough set of wavebands;

identifying which pixels in the scene are candidate detections based on the processed pixels;

processing each of the candidate detections with the full set of wavebands using a localized scene covariance; and detecting the target in the scene based on the localized scene covariance processed candidate detections.

18. A system for selecting a subset of hyperspectral imaging wavebands to detect a target in a scene, the system comprising:

a memory having computer executable instructions thereupon;

at least one interface receiving a plurality of spectra of a target and a covariance matrix of a scene;

a filtering engine coupled to the memory and the at least one interface, the computer executable instructions when executed by the filtering engine cause the filtering engine to, for each spectrum in the plurality of spectra of the target:

compute a signal-to-clutter ratio of a full set of wavebands representing the probability of detecting the target viewed in the scene;

select a subset of the full set of wavebands, including determining, in a number of iterations, included sets of wavebands by selecting a waveband from an group of wavebands which when combined with wavebands of an input set of wavebands have, collectively, the highest signal-to-clutter ratio, the group of wavebands of a first iteration being a full set of wavebands and groups of wavebands of subsequent iterations being the full set of wavebands less wavebands selected in previous iterations, adding the selected waveband to the input set of wavebands resulting in intermediate set of wavebands, the input set of wavebands of a first iteration having a number of wavebands, including zero, and input sets of wavebands of subsequent iterations being included sets of wavebands determined in previous iterations, deleting one or more wavebands from the intermediate set of wavebands contributing the least to a signal-to-clutter ratio of the intermediate set of wavebands resulting in a set of included wavebands, and ending the iterations when the set of included wavebands has a specified number of wavebands, specified signal-to-clutter ratio or has a specified fraction of the total signal-to-clutter ratio for the full set of wavebands, the set of included wavebands being the subset of wavebands that is selected and from which the good enough set of wavebands is determined;

compute a signal-to-clutter ratio of the selected subset of wavebands representing the probability of detecting the target viewed in the scene using the selected subset of wavebands;

compare the signal-to-clutter ratio of the subset of wavebands to the signal-to-clutter ratio of the full set of wavebands;

determine whether the subset of wavebands is a good enough set of wavebands based on the comparison; and provide the good enough set of wavebands to detect the target in the scene.

19. A tangible non-transitory computer-readable storage medium having computer readable instructions stored therein for selecting a subset of hyperspectral imaging wavebands to detect a target in a scene, which when executed by one or more processors provided with a plurality of spectra of a target and a covariance matrix of a scene cause the one or more processors to, for each spectrum in the plurality of spectra of the target:

compute a signal-to-clutter ratio of a full set of wavebands representing the probability of detecting the target viewed in the scene;

select a subset of the full set of wavebands, including determining, in a number of iterations, included sets of wavebands by selecting a waveband from an group of wavebands which when combined with wavebands of an input set of wavebands have, collectively, the highest signal-to-clutter ratio, the group of wavebands of a first iteration being a full set of wavebands and groups of wavebands of subsequent iterations being the full set of wavebands less wavebands selected in previous iterations, adding the selected waveband to the input set of wavebands resulting in intermediate set of wavebands, the input set of wavebands of a first iteration having a number of wavebands, including zero, and input sets of wavebands of subsequent iterations being included sets of wavebands determined in previous iterations, deleting one or more wavebands from the intermediate set of wavebands contributing the least to a signal-to-clutter ratio of the intermediate set of wavebands resulting in a set of included wavebands, and ending the iterations when the set of included wavebands has a specified number of wavebands, specified signal-to-clutter ratio or has a specified fraction of the total signal-to-clutter ratio for the full set of wavebands, the set of included wavebands being the subset of wavebands that is selected and from which the good enough set of wavebands is determined;

compute a signal-to-clutter ratio of the selected subset of wavebands representing the probability of detecting the target viewed in the scene using the selected subset of wavebands;

compare the signal-to-clutter ratio of the subset of wavebands to the signal-to-clutter ratio of the full set of wavebands;

determine whether the subset of wavebands is a good enough set of wavebands based on the comparison; and provide the good enough set of wavebands to detect the target in the scene.

\* \* \* \* \*